United States Patent [19]
Boisvert et al.

[11] Patent Number: 5,266,776
[45] Date of Patent: Nov. 30, 1993

[54] PLASMA ARC CUTTING AND WELDING TIP

[75] Inventors: John A. Boisvert, Grafton; Barry T. Aher, Sullivan, both of N.H.

[73] Assignee: Thermal Dynamics Corporation, St. Louis, Mo.

[21] Appl. No.: 927,009

[22] Filed: Aug. 10, 1992

[51] Int. Cl.⁵ .................................................. B23K 9/00
[52] U.S. Cl. .................................. 219/121.39; 219/119; 219/121.52
[58] Field of Search ................... 219/121.520, 121.480, 219/121.5, 76.16, 74, 75, 118, 119

[56]  References Cited
U.S. PATENT DOCUMENTS

| | | | |
|---|---|---|---|
| 4,058,698 | 11/1977 | Bykhorsky et al. | 219/121.520 |
| 4,748,312 | 5/1988 | Hatch et al. | 219/121.520 |
| 5,101,088 | 3/1992 | Andersson et al. | 219/121.520 |
| 5,105,061 | 4/1992 | Blankenship | 219/119 |

Primary Examiner—Mark H. Paschall
Attorney, Agent, or Firm—Paul M. Denk

[57] ABSTRACT

A plasma arc cutting tip is provided having chamfer tip edge so that it can be easily moved and dragged across a workpiece for drag cutting and having counterbored plasma arc exit orifice which keeps the exit orifice off the workpiece so that the tip can tolerate plasma arc deflection without suffering tip damage or tip failure.

1 Claim, 1 Drawing Sheet

PLASMA ARC CUTTING AND WELDING TIP

BACKGROUND OF THE INVENTION

This invention relates to a plasma cutting and welding tip, and more specifically, to a counterbored plasma tip designed to prevent damage to the tip caused by plasma arc deflection.

Plasma arc cutting and welding is similar to other forms of arc cutting and welding in that an arc is arranged to run between an electrode in a torch and the workpiece that is to be cut. Generally, the electrode is at a negative polarity and the elections move to the workpiece, which is the anode. Considerable heat is generated in the arc and most of the heat is released at the anode.

The arc usually runs in an atmosphere of argon gas in order to prevent oxidation of the metal. Air is also a very common plasma gas and a Hafnium electrode is used particularly when cutting mild steels. In plasma welding or cutting, a tungsten electrode is used and inert gas, such as Argon flows through the torch. However, a narrow nozzle or tip is placed just below the electrode to constrict the arc thereby increasing the temperature of the arc as well as increasing the velocity of the inert plasma gas. Power used in plasma cutting is much higher than in conventional, or plasma arc welding and the arc is much more constricted by the plasma cutting tip. Therefore, the combination of the power intensity and the gas flow can push a hole right through the metal workpiece making a plasma arc quite useful as a cutting torch.

Traditional plasma tip drag cutting is done with the tip orifice in contact with the metal to be cut. However, if the tip is moved onto new metal faster than the arc can cut or remove metal, the arc is deflected. If the plasma arc cutting tip is constructed to maximize cut quality, that is, constructed to severely constrict the outflow of the plasma arc, there is minimal tolerance for arc deflection in the tip and the arc is deflected into contact with the tip thereby causing tip damage or tip failure. One solution is to use a tip with an oversize orifice so that the arc is not constricted and so that the deflected arc does not touch the walls of the tip. However, this does not allow for optimum cutting efficiency because it does not constrict the arc so as to increase the force of the arc and the velocity of exiting plasma column.

SUMMARY OF THE INVENTION

It is therefore an object of the invention to provide a plasma arc cutting tip that can accommodate arc deflections without suffering tip failure.

Another object of the invention is to provide a plasma arc cutting tip that has a counterbored tip orifice thereby creating a tolerance for arc deflection.

Still another object of the invention is to provide a plasma arc cutting tip wherein the tip orifice counterbore keeps the plasma exit orifice off of the workpiece.

Yet another object of the invention is to provide a plasma arc cutting tip that allows the tip face to remain in contact with the workpiece during a drag cutting operation.

Still another object of the invention is to provide a plasma arc cutting tip that has a chamfer edge to facilitate dragging across a workpiece.

Another object of the invention is to provide a plasma arc cutting tip that has the overall dimensions and design so as to be used with conventional arc cutting equipment, is easily constructed, economical to make, and is well suited for its intended purpose.

Another advantage of a counterbore or angle is that it gives the pilot arc a point of attachment that is not critical to cut performance. Conventionally, the pilot arc would attach to the face of the tip, and as the pilot arc causes tip erosion, the face of the tip becomes eroded at the plasma gas exit point, hence leding to tip failure.

The counterbore offers additional attachment area (the walls of the counterbore) for the pilot to attach to. Therefore, pilot erosion is not limited to the orifice exit point, but dispersed onto the counterbore walls as well. The result is tip wear due to orifice erosion from pilot is decreased. This can be accomplished with a counterbore, or a chamfer on the orifice.

Briefly stated, a plasma cutting tip is provided that has the overall design and dimensions of a conventional tip, that has a counterbored arc exit orifice thereby creating room for arc deflection between the orifice exit and the workpiece so that there is no damage to the tip due to plasma arc deflection. The tip has a chamfer edge to facilitate dragging across the workpiece and provides extended pilot arc tip life.

DESCRIPTION OF THE PREFERRED EMBODIMENT

Figure 1:
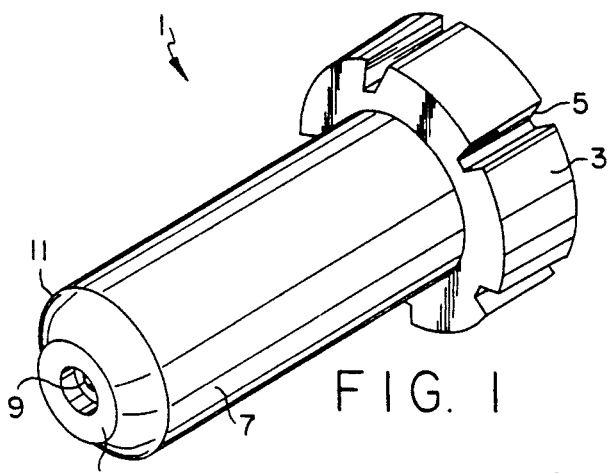
FIG. 1 is an isometric view of the plasma cutting tip of the present invention.

The plasma cutting tip of the present invention is shown generally as 1 in FIG. 1. Tip 1 is formed from an appropriate metal such as copper and has a fastening collar 3 with tool grooves 5 formed therein for securing tip one to a plasma cutting torch in the manner as well known to the art. Tip 1 has a hollow, elongate barrel 7, plasma outlet orifice 9, tip chamfer 11, and counterbored orifice recess 13 as will now be explained in more detail.

Figure 2:
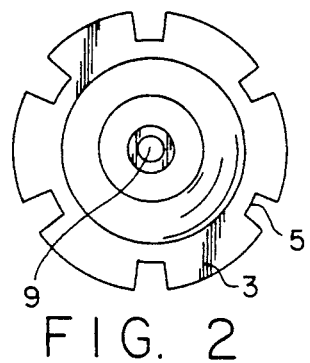
FIG. 2 is a top plan of the plasma cutting tip of the present invention.
Figure 3:
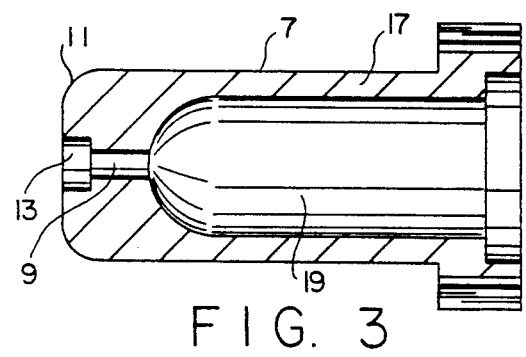
FIG. 3 is a cross-sectional view of the plasma cutting tip of the present invention.

FIGS. 2-3 best illustrate the internal configuration and design of tip 1. Wall 17 of barrel 7 is a generally hollow cylinder having electrode space 19 formed therein. Space 19 is designed to house a consumable electrode that functions as a negative pole (see FIGS. 5-6) to create the plasma arc. Wall 17 has a tip chamfer 11 formed thereon so that tip 1 can be easily dragged across a workpiece as will be described hereinafter.

Wall 17 is substantially thicker at chamfer 11 and has a plasma outlet orifice 9 formed therein which is cooperatively connected to electrode space 19 so that a plasma arc generated by the electrode E (FIG. 5) can exit tip 1. Outlet orifice 9 exits into outlet orifice recess 13 which is counterbored in outlet orifice 9.

Figure 4:
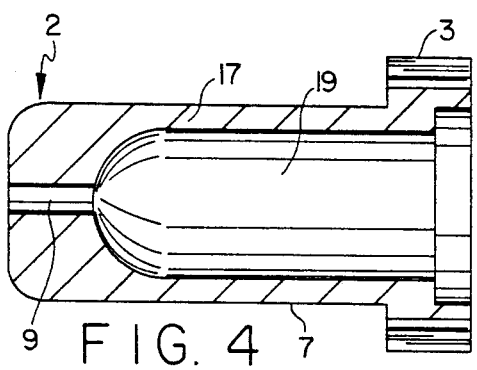
FIG. 4 is a cross-sectional view of a prior art plasma cutting tip.

By contrast, FIG. 4 illustrates a traditional tip as shown generally at 2. Tip 2 also has an attachment collar 3, a barrel 7, an electrode space 19 formed therein, and a plasma outlet orifice 9. However, in the prior art, tip 2 does not have a outlet orifice recess counterbored in outlet orifice 9. The novel counterbore of the present invention functions to prevent tip failure in the following manner as best illustrated in FIGS. 5-7.

Figure 5:
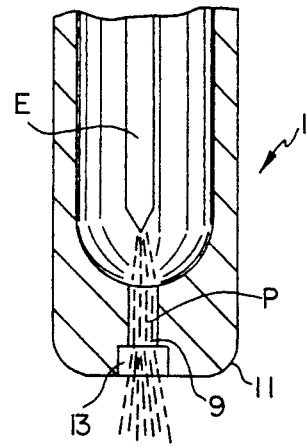
FIG. 5 is a partial cross-sectional view of the plasma cutting tip of the present invention illustrating the exiting of a plasma arc.

FIG. 5 illustrates a plasma arc P generated by electrode E exiting the tip through plasma exit orifice 9 and out through recess 13. Recess 13 functions to keep orifice 9 recessed from the workpiece (not shown) as the tip is dragged along the workpiece. During a cutting operation, tip I is dragged across the workpiece (not shown) aided by chamfer 11.

Figure 6:
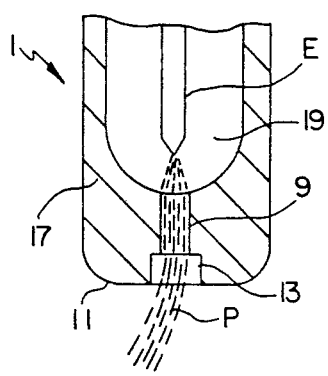
FIG. 6 is a partial cross-sectional view of the plasma cutting tip resent invention illustrating the deflection of an exiting plasma arc.
Figure 7:
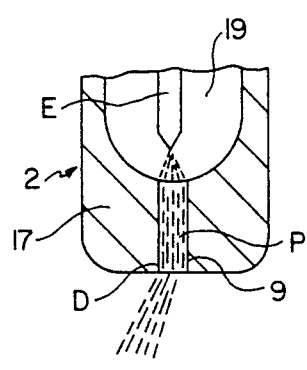
FIG. 7 is a partial cross-sectional view of the prior art plasma cutting/tip illustrating the deflection of an exiting plasma arc.

FIG. 6 illustrates the deflection of the plasma arc P within recess 13. As shown, plasma arc P exits orifice 9 and through recess 13. The deflected arc plasma P is tolerated within recess 13 and does not make contact with wall 17 or chamfer 11. FIG. 7 illustrates the effect of plasma arc deflection in prior art tip 2. Electrode E generates plasma arc P which exits through orifice 9. However, deflected plasma arc P makes contact with wall 17 thereby causing damage at point D resulting in tip failure.

It should be noted that there may be numerous changes in the dimensions, configurations, and material make-up of the plasma cutting tip without departing from the scope of the invention.

Having thus described the invention, what is claimed and desired to be secured by Letters Patent is:

1. A plasma arc cutting and welding tip comprising: an attachment means for attaching a tip to a torch, a barrel, said barrel extending from said attachment means, said barrel having an electrode chamber formed therein to accommodate a plasma arc generating electrode, said barrel also having a plasma exit orifice formed therein so as to allow a plasma arc to exit to a workpiece, said plasma exit orifice having a recess counterbored therein, said counterbored recess being cylindrically shaped and being of a greater diameter than said exit orifice, said counterbored recess having a diameter of approximately two and one-half times the diameter of said exit orifice, said recess cooperatively connected to said orifice, said recessed design to provide clearance and allow deflection of the plasma arc within said recess without causing damage to the welding tip.

* * * * *